UNITED STATES PATENT OFFICE.

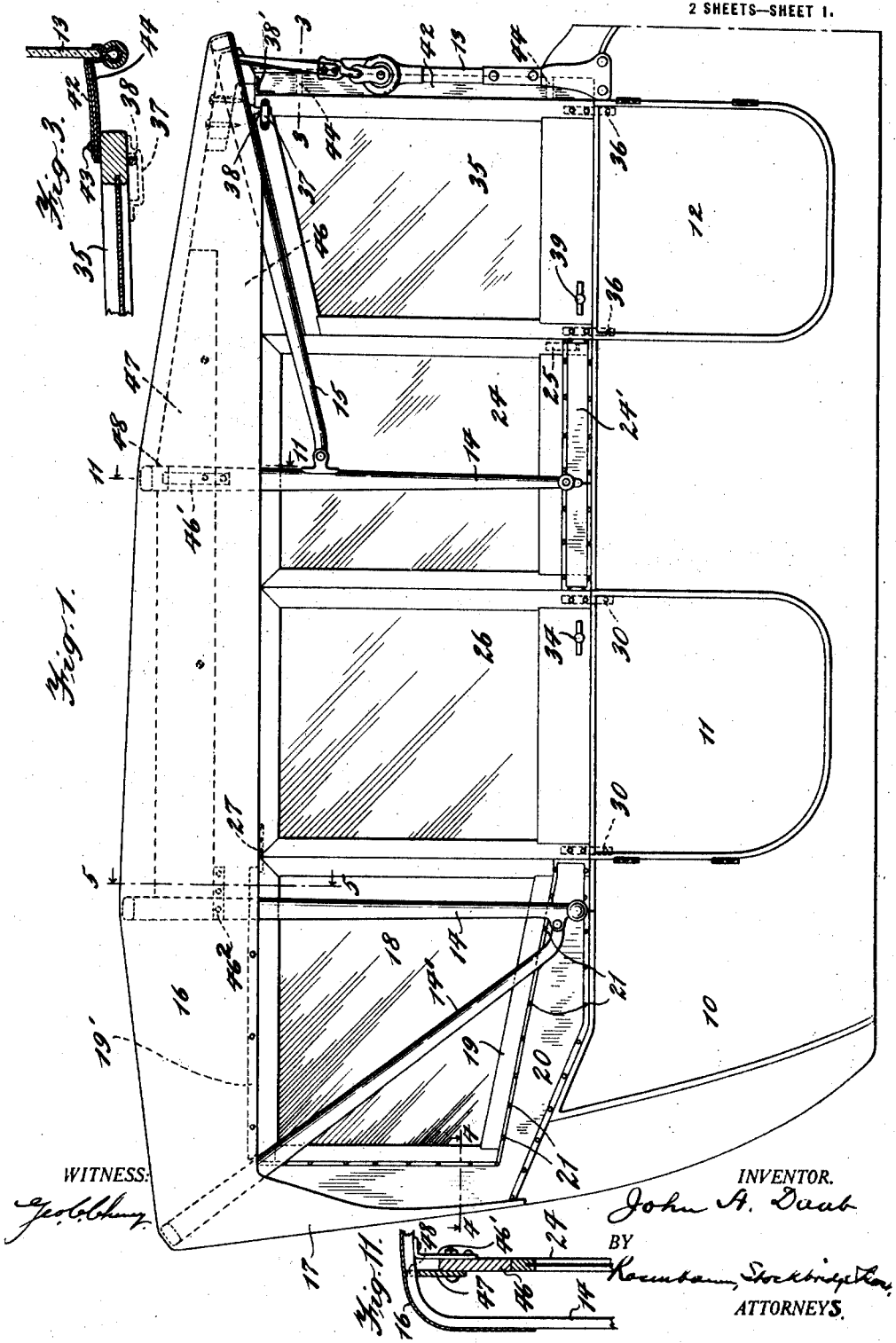

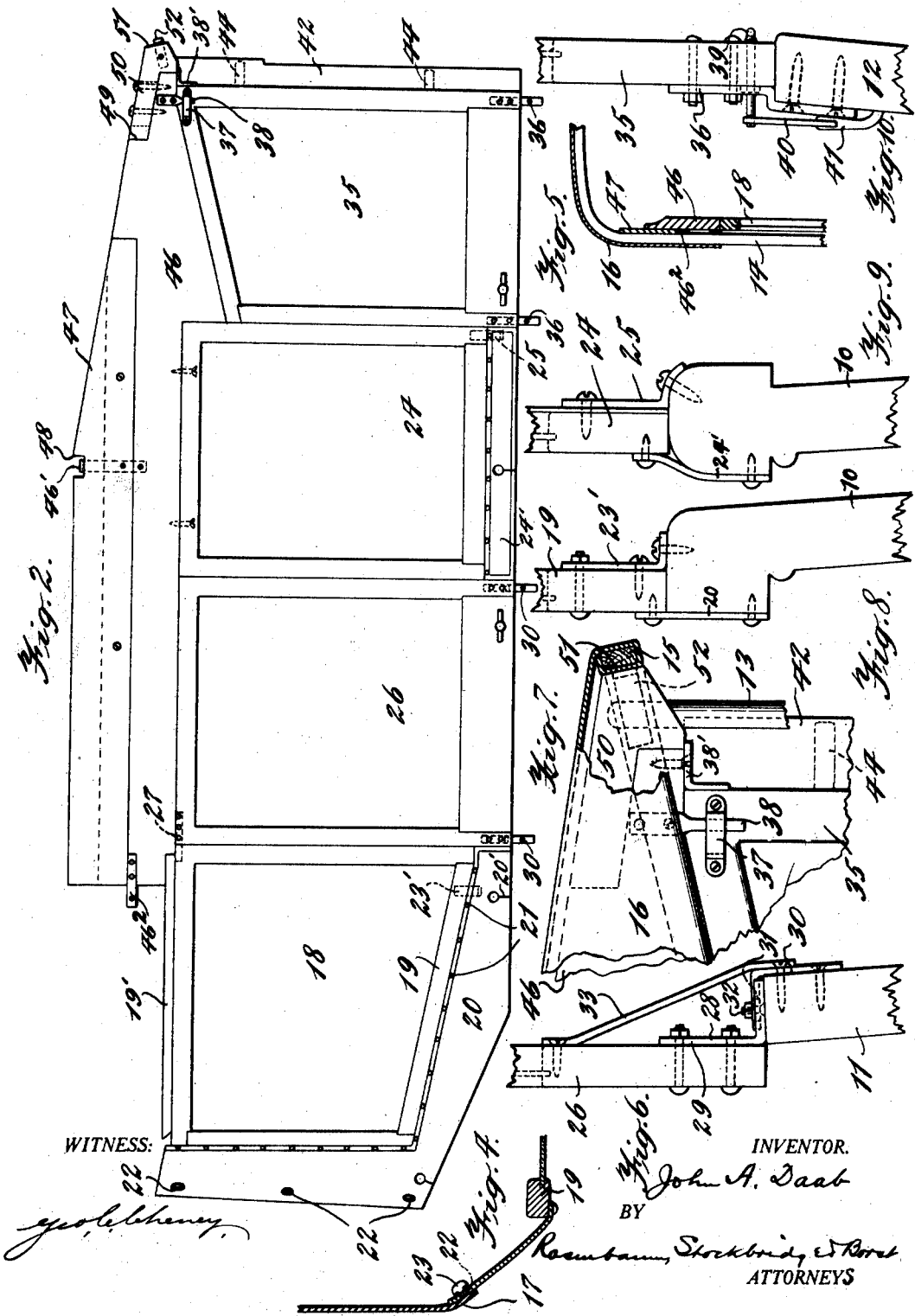

JOHN A. DAAB, OF NEW YORK, N. Y.

AUTOMOBILE-TOP CLOSURE.

1,401,395.   Specification of Letters Patent.   Patented Dec. 27, 1921.

Application filed December 10, 1919. Serial No. 343,846.

*To all whom it may concern:*

Be it known that I, JOHN A. DAAB, a citizen of the United States, residing at the city of New York, borough of Manhattan, and State of New York, have invented certain new and useful Improvements in Automobile-Top Closures, of which the following is a full, clear, and exact description.

My invention relates to vehicle closures and has more special reference to the provision of a closure adapted to be used in conjunction with the usual automobile touring car top as provided by the car manufacturer. When my closure is used in conjunction with such tops, a closed body effect simulating in appearance the regulation closed bodies is obtained.

While I am aware that side closures adapted to be used in conjunction with touring car tops are known, such tops are difficult to install, are not generally applicable to different makes of cars and do not provide a tight connection between the closure proper and the touring car top. Most touring car tops change their shape through the stretching of the material after use or through other causes. Hence any closure appliance having a fixed configuration will not result in a permanently tight closure. I aim to provide a closure of such character that the necessary adjustments and changes in configuration of the closure may be readily effected as occasion demands, to produce a structure which will compare favorably in appearance with the so-called closed or winter bodies. My invention also contemplates the provision of means to obtain the necessary ventilation by providing weather strips between the windshield and the glass panels of my closure of such character that they will remain in any position in which they are set, thus enabling the car to be readily ventilated.

In order to give a symmetrical effect to my closure it is evident that the glass panels must be set vertically. Since automobile doors are usually arranged to hang in a tilted position due to the inclination of the sides of the body, I have provided a loose hinge connection for the upper end of the coöperating panel so that the axis of the panel connection may shift when the door is opened, thus permitting me to secure the lower portion of the panel frame directly to the door. My invention also contemplates the provision of various adjustments which not only enable me to compensate for the irregularities of cars of a given make but also to apply the closure to cars of different make by slight variations in the construction.

In the drawings which exemplify my invention,

Figure 1 is a side elevation of a touring automobile body having the usual touring car top and showing my invention as applied thereto.

Fig. 2 is an elevation of one side of my closure means.

Fig. 3 is a section of Fig. 1 on the line 3—3.

Fig. 4 is a section of Fig. 1 on the line 4—4.

Fig. 5 is a section of Fig. 1 on the line 5—5.

Fig. 6 is a detail view showing the connection between the rear door and the movable panel secured thereto.

Fig. 7 is a detail view partly in section, of the forward end of the top and adjacent parts.

Figs. 8 and 9 are detail views, showing the connections between the body and the fixed panels.

Fig. 10 is an edge view of the front door showing the latch connections, and

Fig. 11 is a detail section on the line 11—11 of Fig. 1.

Referring to the drawings an automobile body 10 has the usual rear door 11, fore door 12, windshield 13, upstanding bows 14, rear bow 14' and front bow 15. The various bows support the usual foldable touring car top 16 having the customary downwardly depending rear curtain 17. A fixed side panel indicated in its entirety by 18 is provided at the rear of the body 10, the same extending forwardly to the line of the rear edge of the side door 11. This panel 18 is made of transparent material such as glass, supported in a suitable frame or sash 19. The upper edge of the frame 19 has secured to it a strip 19' which projects outwardly beyond the plane of the panel 18 and to which the overhanging portion of the top is tacked, as shown. In order that a finished appearance may be given to the assembled structure I provide a piece of material 20, such as leatherette, and secure it to the lower and rear edge of the frame 19 by suitable upholstery tacks 21. The rear vertical edge of this finishing strip is provided with buttonhole openings 22 adapted to engage the usual turnbuttons 23, usually provided on the inner face of the rear curtain 17. The lower edge of the strip 20 is subsequently tacked to the body 10 as shown in Fig. 1. The strip 20 is also provided with the necessary openings 20' similar to those usually provided in the side curtains to receive the brackets supporting the top bows of the car. The frame 19 of the panel 18 is secured to the body 10 along the side of the rear seat cushion by a suitable bracket or angle iron 23' as shown in Fig. 8. A similar transparent panel 24 is secured to the body 10 along the side of the front seat cushion by a bracket 25 as shown in Fig. 9, while a finishing strip 24' of material such as leatherette connects the lower end of the panel with the body. A swinging panel 26 secured to the upper edge of the rear door 11 is provided between and abuts against the stationary panels 18 and 24. The rear upper corner of this panel is secured to a pivotally mounted hinge plate 27, while the lower end of the panel is secured to the rear door 11 by a bracket 28 comprising two overlapping angle irons 29 and 30 (as shown in Fig. 6). The overlapping ends of these irons are each provided with suitable slots 31 which are adapted to register with each other. A bolt 32 passes through these slots and locks the irons together in any desired position. A vertically extending sway brace 33 connects the frame of panel 26 and the door 11 so as to furnish proper support for this panel. The transparent panel 26 secured to the upper portion of the door 11 is provided with a handle 34 which operates the usual door handle in a manner which will be more fully explained in connection with the front door handle where it is fully illustrated. A transparent panel 35 similar to the panels heretofore described is secured to the upper edge of fore door 12. The lower end of this panel is secured to the door 12 by a bracket 36 while its upper portion carries a loop 37 which receives a downwardly depending pivot pin 38 secured to a stationary filling strip to be described. A stop 38' limits the forward movement of the upper end of the panel 35, and coöperates with the fixed panel 24 to hold said panel 35 against vibration when the door 12 is closed. This manner of pivotally supporting the panel is to enable it to move freely with the fore door 12 to which it is secured. The panel 35 is further provided with an outside handle 39, the inwardly projecting shank of which has a downwardly depending fork 40 secured to its inside end. This fork engages the usual latch blade handle 41 as generally provided on automobile doors. This construction enables the door 12 to be opened from the outside by manipulating handle 39 and from the inside by operating the blade handle 41. In order that the space between the transparent panel 35 and the windshield 13 may be effectually closed, I provide a vertically extending weather strip 42, one edge of which is secured to the panel 35 by upholstery tacks 43 (see Fig. 3), while its opposite edge engages the windshield 13. In order that the strip 42 may maintain any predetermined position I provide in each of the strips a plurality of transverse stiffening strips 44, preferably of a pliable metal. The provision of the pliable metal stiffening strips enables me to bend the weather strip to any desired position and thus provide ventilation for the car when desired. In order to close the space between the upper edges of the transparent panels and the roof of the touring car top, I provide a fixed filling strip 46 having its lower edge conforming to the upper edge of the adjacent transparent panels. The filling strip 46 is secured to the stationary panel 24 in any desired manner, preferably by wood screws extending through the upper part of the frame of the panel and into the strip as shown. The strip 46 is also secured to the bracket 46' connected to the horizontal portion of the front upstanding bow 14, and to the bracket $46^2$ connected to the vertical portion of the rear upstanding bow 14. In order to provide for any variation in the touring car top, either as initially manufactured or as created by subsequent use, I provide an extension strip 47 having a notch 48 to receive the horizontal portion of the forward upstanding bow 14. This extension strip overlaps the main filling strip (as shown in Figs. 5 and 11) and is adjustably secured thereto, preferably by wood screws. This extension strip enables me to secure a tight fit between my closure and the touring car top. In order to provide for any variation in the length of the top, the front portion of the filling strip 46 is cut away at 49, as indicated in Fig. 2. An adjustable block 50 is adapted to fit and move in this cutaway portion so that its forward end 51 may be made to abut against the inner face of the forwardly projecting bow 15. This block is slotted, and is locked in adjusted position by screws extending through the slots into the filler strip 46. A bracket 52 is secured to the block 50 and is secured to the front bow when the block 50 has been brought to its proper position.

While I have illustrated and described my improved closure as applied to but one side of an automobile, it is to be understood that the opposite or left hand side of the car is also closed, preferably by panels which are fixed in position.

My invention has been illustrated and described in conjunction with the Ford car, but manifestly it may, with slight modifications in the details thereof, be applied with equally good results to cars of other makes. The panel associated with the left-hand front door of the car may be fixed by brackets similar to those provided for the other fixed panels already described. The lefthand rear door may also have a panel secured thereto in such a manner that the door is rendered temporarily inoperative. If it is desired to have this door open it is evident that the panel may be secured thereto in any manner similar to that employed in securing panel 26 to the rear door 11.

It will be quite evident from the foregoing description that the relation between the panels and the body and top of the touring car may be readily adjusted so as to provide a wind tight construction, while the various filling panels not only provide a finished effect to the car but also enable a tight fit between the panels and the parts of the car with which they are associated.

I claim:

1. The combination with a vehicle body having a top which is open at the sides, of a plurality of transparent panels between the top and body, a fixed strip secured to some of the transparent panels, and an extension member adapted to be set in different positions with respect to the strip to close the space between the top and fixed strip.

2. The combination with a vehicle body having a top which is open at the sides, of transparent panels between the top and body, and extensible means comprising a fixed filler strip having a cutaway portion and an adjustable block in said cutaway portion, for closing the space between the top and the panels.

3. The combination with a vehicle body having a top which is open at the sides, of filler elements between the vehicle top and body, a fixed strip having its lower edge in contact with the upper edge of the filler elements and having a cutaway portion at its forward end, and a block adjustably mounted in said cutaway portion and adapted to close the space between the front end of the fixed filler strip and the front bow of the vehicle top.

4. The combination with a vehicle body having a top which is open at the sides, of filler elements between the top and body, and a fixed strip between the filler elements and the top having a cutaway portion at its forward end, and a block adjustably mounted in said cutaway portion and adapted to close the space between the forward end of the fixed strip and the front bow of the vehicle top.

5. The combination with a vehicle body having a top which is open at the sides, of a plurality of transparent panels between the top and body, a fixed strip having its lower edge in contact with the upper edge of the panels, and having a cutaway portion, an extension strip between the fixed strip and the vehicle top adapted to be set in different positions with respect to the fixed strip to close the space between the vehicle top and the fixed strip, and an adjustable block in said cutaway portion to close the space between the forward end of the fixed element and the front bow of the vehicle top.

6. In a vehicle closure, the combination with a vehicle body having a top which is open at the sides and a windshield, of filler elements between the top and body, and pliable ventilating means between the front filler element and the windshield and adapted to be bent to provide the desired opening for ventilation.

7. The combination with a vehicle body having a top which is open at the sides and a windshield, of filler elements in the side portions between the top and body, a pliable strip that is capable of retaining various shapes given it supported between the windshield and at least one of the forward filler elements, said pliable strip normally closing the space between the windshield and adjacent filler element and adjustable to variable positions permitting the desired ventilation of the interior of the body.

In witness whereof I subscribe my signature.

JOHN A. DAAB.